(12) United States Patent
Nakamura et al.

(10) Patent No.: US 10,489,141 B2
(45) Date of Patent: Nov. 26, 2019

(54) RELAY DEVICE, ELECTRONIC CONTROL UNIT, AND VEHICLE-MOUNTED SYSTEM

(71) Applicant: DENSO CORPORATION, Kariya, Aichi-pref. (JP)

(72) Inventors: Sho Nakamura, Kariya (JP); Yuzo Harata, Kariya (JP); Mitsuyoshi Natsume, Kariya (JP); Masakazu Doi, Kariya (JP); Naoji Kaneko, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 17 days.

(21) Appl. No.: 15/743,777

(22) PCT Filed: Jul. 14, 2016

(86) PCT No.: PCT/JP2016/070770
§ 371 (c)(1),
(2) Date: Jan. 11, 2018

(87) PCT Pub. No.: WO2017/014133
PCT Pub. Date: Jan. 26, 2017

(65) Prior Publication Data
US 2018/0203685 A1 Jul. 19, 2018

(30) Foreign Application Priority Data
Jul. 23, 2015 (JP) .................. 2015-145759

(51) Int. Cl.
*G06F 9/44* (2018.01)
*G06F 8/65* (2018.01)
(Continued)

(52) U.S. Cl.
CPC .......... *G06F 8/65* (2013.01); *G05B 19/0426* (2013.01); *H04L 12/40* (2013.01); *H04L 67/12* (2013.01);
(Continued)

(58) Field of Classification Search
None
See application file for complete search history.

(56) References Cited

U.S. PATENT DOCUMENTS 6,108,598 A * 8/2000 Sumitani ............. F02D 41/2487
123/479
8,813,061 B2 * 8/2014 Hoffman ................... G06F 8/65
717/168
(Continued)

FOREIGN PATENT DOCUMENTS

JP 2003019931 A 1/2003
JP 2003046536 A 2/2003
(Continued)

*Primary Examiner* — Insun Kang
(74) *Attorney, Agent, or Firm* — Harness, Dickey & Pierce, P.L.C.

(57) ABSTRACT

A relay device is provided. The relay device includes: an acquisition unit acquiring data necessary for an upgrade processing from an upgrading tool, which performs the upgrading processing to an ECU connected to a vehicle-mounted network; a relay unit providing the data, via the vehicle-mounted network, to a target ECU which is subject to the upgrade processing; a suspend instructing unit transmitting, via the vehicle-mounted network, a suspend command which instructs the non-target ECU to shift to a suspend state in which a transmission of other data to the non-target ECU via the vehicle-mounted network is suspended in response to a start of the upgrade processing; and a cancel instructing unit instructing, via the vehicle-mounted network, the non-target ECU to cancel the suspend state when the upgrade processing is completed.

10 Claims, 9 Drawing Sheets

(51) Int. Cl.
  *G05B 19/042* (2006.01)
  *H04L 29/08* (2006.01)
  *H04L 12/40* (2006.01)

(52) U.S. Cl.
  CPC ........... *G05B 2219/2637* (2013.01); *H04L 2012/40273* (2013.01)

(56) References Cited

U.S. PATENT DOCUMENTS

| | | | |
|---|---|---|---|
| 2003/0009271 A1 | 1/2003 | Akiyama | |
| 2006/0248172 A1* | 11/2006 | Zurawka | G06F 8/654 709/220 |
| 2007/0005204 A1* | 1/2007 | Yamamoto | G06F 8/65 701/33.4 |
| 2007/0100513 A1* | 5/2007 | Asano | G08G 1/0104 701/2 |
| 2007/0250254 A1* | 10/2007 | Kimoto | G06F 8/65 701/114 |
| 2009/0037780 A1* | 2/2009 | Nakagaki | G06F 11/0739 714/48 |
| 2010/0313192 A1* | 12/2010 | Natsume | G06F 8/65 717/168 |
| 2012/0124571 A1* | 5/2012 | Nagai | G06F 8/61 717/173 |
| 2012/0167071 A1* | 6/2012 | Paek | G06F 8/65 717/170 |
| 2012/0323402 A1* | 12/2012 | Murakami | G06F 8/65 701/1 |
| 2013/0079950 A1* | 3/2013 | You, II | H04L 67/34 701/1 |
| 2013/0132939 A1* | 5/2013 | Murata | H02J 7/041 717/173 |
| 2013/0197712 A1* | 8/2013 | Matsuura | B60R 25/24 701/1 |
| 2013/0212571 A1* | 8/2013 | Matsuura | G06F 8/65 717/170 |
| 2014/0068590 A1* | 3/2014 | Natsume | G06F 8/65 717/170 |
| 2014/0082599 A1* | 3/2014 | Kim | G06F 8/65 717/168 |
| 2014/0325500 A1* | 10/2014 | Jang | G06F 8/65 717/173 |
| 2014/0351460 A1* | 11/2014 | Tsuboi | G06F 8/60 710/36 |
| 2014/0358362 A1* | 12/2014 | Breed | G06F 8/65 701/31.9 |
| 2015/0113521 A1* | 4/2015 | Suzuki | G06F 8/65 717/173 |
| 2015/0128123 A1* | 5/2015 | Eling | G06F 8/654 717/171 |
| 2015/0227359 A1* | 8/2015 | Todoroki | G06F 8/65 717/169 |
| 2015/0277890 A1* | 10/2015 | Throop | B60L 58/13 717/172 |
| 2015/0301822 A1* | 10/2015 | Takahashi | G06F 13/00 717/173 |
| 2016/0188315 A1* | 6/2016 | Mere | G06F 8/654 717/170 |
| 2016/0202966 A1* | 7/2016 | Vangelov | G06F 8/654 717/172 |
| 2016/0210131 A1* | 7/2016 | Vangelov | G06F 8/65 |
| 2016/0266886 A1* | 9/2016 | Sarkar | G06F 8/65 |
| 2016/0359545 A1* | 12/2016 | Kodama | H04L 12/407 |
| 2016/0371076 A1* | 12/2016 | Moeller | H04L 67/34 |
| 2016/0371077 A1* | 12/2016 | Moeller | H04L 67/12 |
| 2016/0378457 A1* | 12/2016 | Adachi | G06F 9/445 713/181 |
| 2017/0075678 A1* | 3/2017 | Kurosawa | B60R 16/02 |
| 2017/0090907 A1* | 3/2017 | Kurosawa | G06F 8/654 |
| 2017/0134164 A1* | 5/2017 | Haga | B60R 16/023 |
| 2018/0018160 A1* | 1/2018 | Teraoka | B60R 16/02 |
| 2018/0018164 A1* | 1/2018 | Kurosawa | B60R 16/0231 |
| 2018/0081671 A1* | 3/2018 | Naruse | G06F 11/00 |
| 2018/0150290 A1* | 5/2018 | Matsuda | G06F 13/00 |
| 2018/0173515 A1* | 6/2018 | Goltz | G06F 8/65 |
| 2018/0189045 A1* | 7/2018 | Dalke | B60W 30/06 |

FOREIGN PATENT DOCUMENTS

| | | |
|---|---|---|
| JP | 2008155736 A | 7/2008 |
| JP | 2014230140 A | 12/2014 |

* cited by examiner

RELAY DEVICE, ELECTRONIC CONTROL UNIT, AND VEHICLE-MOUNTED SYSTEM

CROSS REFERENCE TO RELATED APPLICATIONS

This application is a U.S. National Phase Application under 35 U.S.C. 371 of International Application No. PCT/JP2016/070770 filed on Jul. 14, 2016 and published in Japanese as WO 2017/014133 A1 on Jan. 26, 2017. This application is based on and claims the benefit of priority from Japanese Patent Application No. 2015-145759 filed on Jul. 23, 2015. The entire disclosures of all of the above applications are incorporated herein by reference.

TECHNICAL FIELD

The present disclosure relates to a relay device and an electronic control unit (hereinafter, abbreviated to ECU) connected to a vehicle-mounted network, and also relates to a vehicle-mounted system including the relay device and the electronic control unit.

BACKGROUND ART

A technique in the related art enables a program to be written into an ECU by allowing the ECU to communicate with a device outside a vehicle by way of a gateway ECU and an in-vehicle LAN (see Patent Literature 1).

PRIOR ART LITERATURE

Patent Literature

Patent Literature 1: JP 2003-46536 A

SUMMARY OF INVENTION

However, when another ECU transmits data to the in-vehicle LAN while a program is being written into the ECU, a data transmission rate decreases and writing of the program slows down.

In view of the foregoing inconvenience, it is an object of the present disclosure to provide a technique of enabling an ECU to be upgraded smoothly via a vehicle-mounted network.

According to an aspect of the present disclosure, a relay device includes an acquisition unit, a relay unit, a suspend instructing unit, and a cancel instructing unit. The acquisition unit acquires data necessary to perform an upgrade processing from an upgrading tool. The upgrading tool performs the upgrade processing to upgrade ECUs connected to a vehicle-mounted network, and the ECUs include a target ECU which is subject to the upgrade processing and a non-target ECU which is not subject to the upgrade processing. The relay unit provides, via the vehicle-mounted network, the data acquired by the acquisition unit to the target ECU. The suspend instructing unit transmits, via the vehicle-mounted network, a suspend command which instructs the non-target ECU to shift to a suspend state in response to a start of the upgrade processing. The suspend state is a state in which a transmission of other data to the non-target ECU via the vehicle-mounted network is suspended. The cancel instructing unit instructs, via the vehicle-mounted network, the non-target ECU to cancel the suspend state when the upgrade processing is completed.

According to the configuration as above, when the upgrade processing on the target ECU is performed by the upgrading tool via the vehicle-mounted network, the non-target ECU (ECU other than the target ECU) suspends transmission of other data to the vehicle-mounted network. Hence, a communication load on the vehicle-mounted network is restricted during an execution of the upgrade processing and data necessary for the upgrade processing is transmitted and received quickly. The non-target ECU resumes transmission of data via the vehicle-mounted network in a reliable manner after the upgrade processing is completed. Hence, the non-target ECU performs processing without any interference once the upgrade processing is completed. Consequently, the ECUs can be upgraded smoothly via the vehicle-mounted network.

According to another aspect of the present disclosure, an ECU includes an acquisition unit, an upgrading unit, a suspending unit, and a suspend cancelling unit. The acquisition unit acquires, via a vehicle-mounted network, data necessary to perform an upgrade processing of own ECU from an upgrading tool through a relay device. The upgrading unit performs a processing associated with the upgrade processing according to the data acquired by the acquisition unit. The suspending unit shifts the own ECU to a suspend state in which a data transmission via the vehicle-mounted network is suspended upon receipt of a suspend command from the relay device via the vehicle-mounted network when the upgrade processing is started. The suspend canceling unit cancels the suspend state upon receipt of a command from the relay device via the vehicle-mounted network when the upgrade processing is completed.

According to the configuration as above, the ECU suspends transmission of data to the vehicle-mounted network while the upgrading tool is performing the upgrade processing on the target ECU via the vehicle-mounted network. Hence, data necessary for the upgrade processing is transmitted and received quickly. The ECU resumes transmission of data via the vehicle-mounted network in a reliable manner after the upgrade processing is completed. Hence, the ECU performs processing without any interference once the upgrade processing is completed. Consequently, the ECU can be upgraded smoothly via the vehicle-mounted network.

According to another aspect of the present disclosure, a vehicle-mounted system includes a plurality of ECUs (20, 40) connected to a vehicle-mounted network, and a relay device connected to a vehicle-mounted network. The relay device includes a relay device side acquisition unit, a relay unit, a suspend instructing unit, and a cancel instructing unit. The relay device side acquisition unit acquires data necessary to perform an upgrade processing from an upgrading tool. The upgrading tool performs the upgrade processing to upgrade the plurality of ECUs, and the plurality of ECUs include a target ECU which is subject to the upgrade processing and a non-target ECU which is not subject to the upgrade processing. The relay unit provides, via the vehicle-mounted network, the data acquired by the relay device side acquisition unit to the target ECU. The suspend instructing unit transmits, via the vehicle-mounted network, a suspend command which instructs the non-target ECU to shift to a suspend state in response to a start of the upgrade processing. The suspend state is a state in which a transmission of other data to the non-target ECU via the vehicle-mounted network is suspended. The cancel instructing unit instructs, via the vehicle-mounted network, the non-target ECU to cancel the suspend state when the upgrade processing is completed.

Each of the plurality of ECUs includes an ECU side acquisition unit, an upgrading unit, a suspending unit, and a suspend canceling unit. The ECU side acquisition unit acquires, from the relay device via the vehicle-mounted network, data that is necessary to perform the upgrade processing of an own ECU and transmitted from the upgrading tool through the relay device. The upgrading unit performs a processing associated with the upgrade processing according to the data acquired by the ECU side acquisition unit. The suspending unit shifts the own ECU to the suspend state upon receipt of the suspend command from the relay device via the vehicle-mounted network when the upgrade processing is started. The suspend canceling unit cancels the suspend state upon receipt of a command from the relay device when the upgrade processing is completed.

According to the configuration as above, when the upgrade processing on the target ECU forming the vehicle-mounted system is performed by the upgrading tool via the vehicle-mounted network, the non-target ECU suspends transmission of other data to the vehicle-mounted network. Hence, a communication load on the vehicle-mounted network is restricted during the upgrade processing and data necessary for the upgrade processing is transmitted and received quickly. The non-target ECU resumes transmission of data via the vehicle-mounted network in a reliable manner after the upgrade processing of the target ECU is completed. Hence, the non-target ECU can perform processing without any interference after the upgrade processing is completed. Consequently, the target ECU can be upgraded smoothly via the vehicle-mounted network.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments will be described using the drawings.

First Embodiment (Configuration)

A vehicle-mounted system 1 of a first embodiment includes a relay device 10 and multiple ECUs capable of performing a communicating via a vehicle-mounted network.

Figure 1:
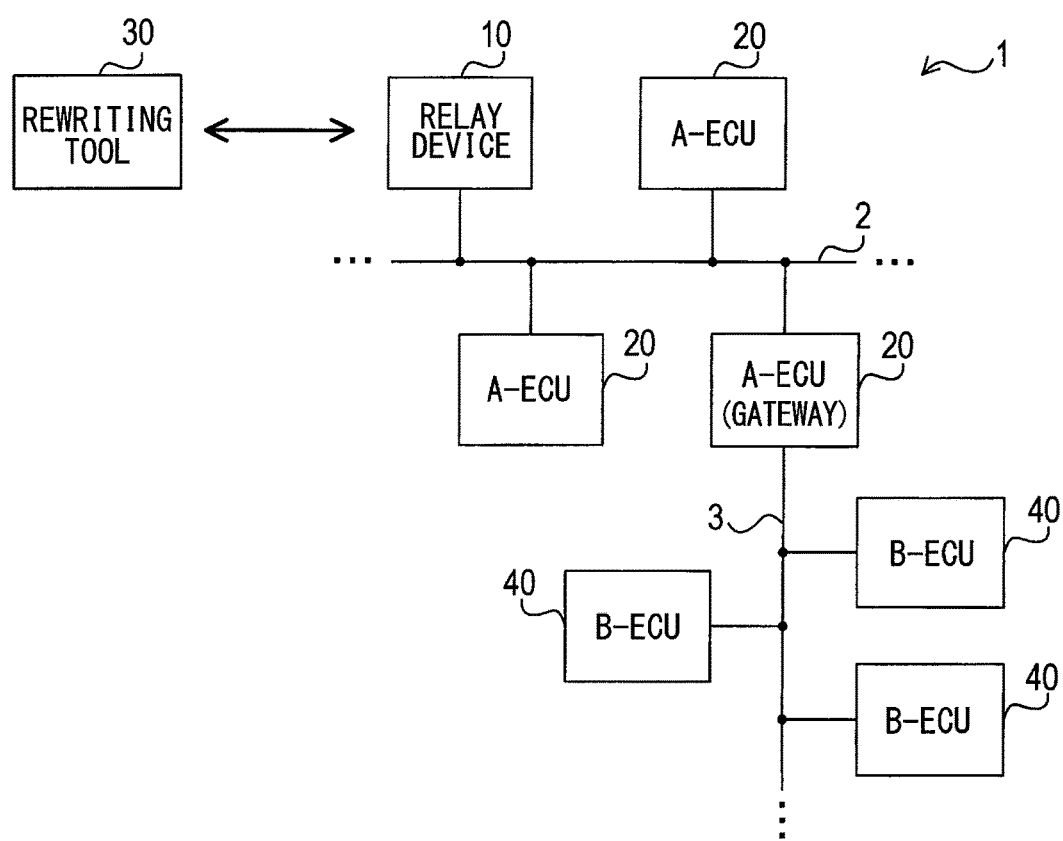
FIG. 1 is a block diagram showing a vehicle-mounted system of a first embodiment.

More specifically, as one example, the vehicle-mounted system 1 may include an A-network 2 to which the relay device 10 and multiple A-ECUs 20 are connected, and a B-network 3 to which multiple B-ECUs 40 are connected. One of the A-ECUs 20 may be provided as a gateway connected to the B-network 3 (FIG. 1). Hereinafter, the example as above is referred to as Case 1. In Case 1, the A-ECU 20 serving as the gateway relays communication between the relay device 10 or other A-ECUs 20 connected to the A-network 2 and the B-ECUs 40 connected to the B-network 3.

Alternatively, a network same as the B-network 3 may be provided additionally, or one of the B-ECUs 40 connected to the B-network 3 may be provided as a gateway connected to another network. Further, the vehicle-mounted system 1 may include only the relay device 10 and the A-ECUs 20 connected to the A-network 2 without the B-network 3.

Figure 2:
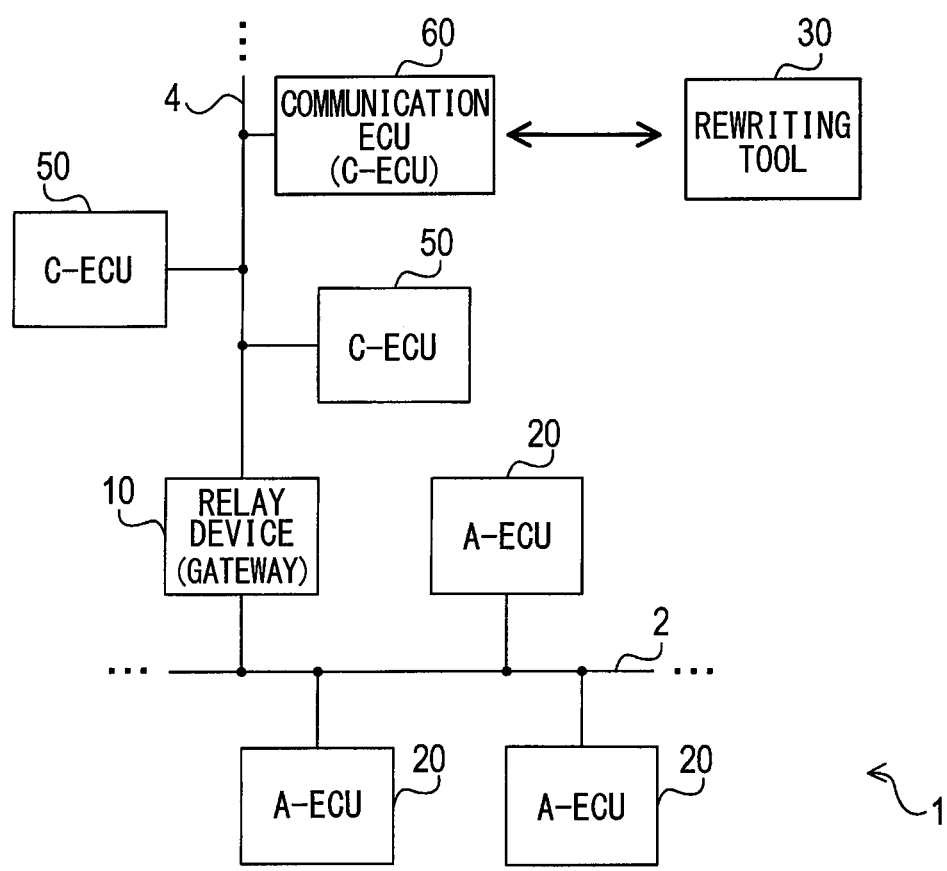
FIG. 2 is another block diagram showing the vehicle-mounted system of the first embodiment.

As another example, the vehicle-mounted system 1 may include an A-network 2 to which the relay device 10 and multiple A-ECUs 20 are connected, and a C-network 4 to which the relay device 10 and multiple C-ECUs 50 are connected in which the relay device 10 serves as a gateway (FIG. 2). Hereinafter, the example as above is referred to as Case 2.

In Case 2, the relay device 10 (gateway) relays communication between the A-ECU 20 connected to the A-network 2 and the C-ECU 50 connected to the C-network 4. One of the C-ECUs 50 connected to the C-network 4 is provided as a communication ECU 60 which communicates with a rewriting tool 30 described below.

It goes without saying that the ECUs connected to the A-network 2 and C-network 4 may be provided as gateways connected to other networks. A communication ECU is not necessarily provided to the C-network 4 and may be provided to a network connected to the C-network 4 via a gateway or another network connected to the network connected to the C-network 4. In this configuration, the relay device 10 may communicate with a communication ECU by way of the C-network 4 and a network to which the communication ECU is connected.

Each of the A-network 2 through C-network 4 may be a vehicle-mounted network in compliance with protocols, for example, the CAN, FlexRay (registered trademark), or Lin protocol.

The ECUs are configured to perform various types of processing involved in driving of the vehicle.

The relay device 10 is configured to communicate with the rewriting tool 30 which rewrites programs stored in the ECUs (hereinafter, rewriting of program may also be referred to as reprogram or perform reprogramming). When the rewriting tool 30 performs reprogramming, the relay device 10 relays communication between the rewriting tool 30 and an ECU to be reprogrammed (target ECU).

More specifically, in Case 1 (FIG. 1), the relay device 10 directly communicates with the rewriting tool 30 through wired or wireless communication, and relays communication between the rewriting tool 30 and a target ECU connected to the A-network 2 or the B-network 3 during reprogramming. An ECU connected to another vehicle-mounted network connected to the A-network 2 or the B-network 3 may be reprogrammed as the target ECU. In such a case, too, the relay device 10 relays communication in a same manner as above. In the description below, "wireless communication" means wireless communication made between the relay device 10 and the rewriting tool 30 either directly or by way of a network, such as a mobile telephone line or Internet.

Meanwhile, in Case 2 (FIG. 2), the relay device 10 communicates with the rewriting tool 30 via the C-network 4. That is, the communication ECU 60 connected to the C-network 4 directly communicates with the rewriting tool 30 through wired or wireless communication and relays communication between the rewriting tool 30 and the relay device 10 via the C-network 4. When one of the A-ECUs 20 connected to the A-network 2 is reprogrammed as a target ECU, the relay device 10 relays communication between the rewriting tool 30 and the target ECU by communicating with the rewriting tool 30 via the communication ECU 60 and the C-network 4. An ECU connected to another vehicle-mounted network connected to the A-network 2 may be reprogrammed as a target ECU. In such a case, too, the relay device 10 relays communication in a same manner as above.

Configurations of the relay device 10 and the ECUs will now be described.

Figure 3:
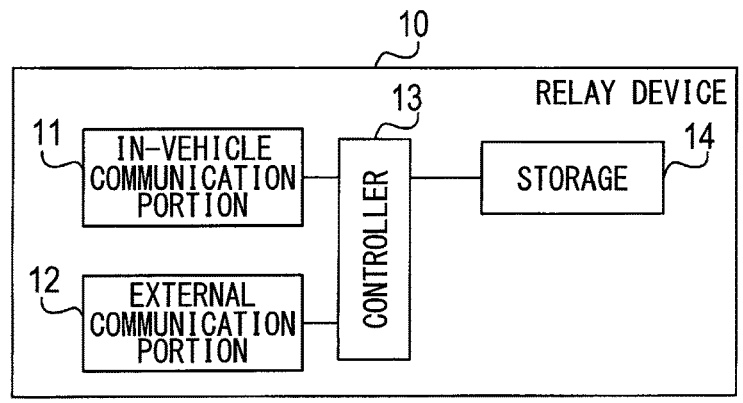
FIG. 3 is a block diagram of a relay device of the first embodiment.

The relay device 10 includes an in-vehicle communication portion 11, an external communication portion 12, a controller 13, and a storage 14 (as shown in FIG. 3).

The in-vehicle communication portion 11 is a portion which communicates with the A-ECUs 20 via the A-network 2.

The external communication portion 12 is a portion which communicates with the rewriting tool 30.

More specifically, in Case 1 (FIG. 1), the external communication portion 12 may be provided as, for example, a portion which wirelessly communicates with the rewriting tool 30 via an unillustrated antenna or the like. Alternatively, the external communication portion 12 may be provided as, for example, a portion which communicates with the rewriting tool 30 via a communication line connected temporarily between the relay device 10 and the rewriting tool 30.

Meanwhile, in Case 2 (FIG. 2), the external communication portion 12 is provided as a portion which communicates with the C-ECUs 50 via the C-network 4, and communicates with the communication ECU 60 to communicate with the rewriting tool 30 via the communication ECU 60.

The controller 13 is chiefly formed of a typical microcomputer including a CPU, a ROM, a RAM, an input-output, a bus line interconnecting the foregoing components, and so on. The controller 13 performs various types of processing according to programs pre-stored in the ROM and programs loaded into the RAM.

The storage 14 is provided by a data-rewritable non-volatile memory, such as a flash memory or an HDD. Programs and various types of data necessary to control the relay device 10 are stored in the storage 14.

Figure 4:
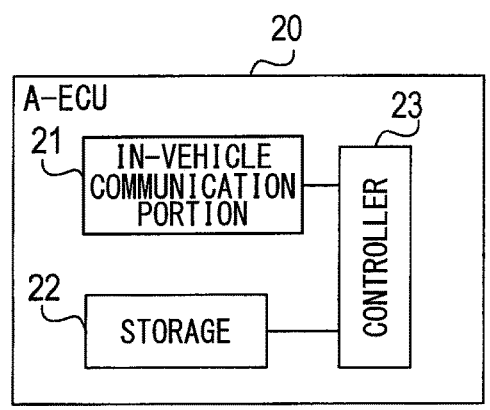
FIG. 4 is a block diagram of an A-ECU of the first embodiment.

Each A-ECU 20 connected to the A-network 2 includes an in-vehicle communication portion 21, a storage 22, and a controller 23 (FIG. 4).

The in-vehicle communication portion 21 is a portion which communicates with ECUs or the like connected to a vehicle-mounted network to which an own device is connected by making communication through the vehicle-mounted network. More specifically, when the own device is connected to the A-network 2, the in-vehicle communication portion 21 communicates with the other A-ECUs 20 connected to the A-network 2. When the own device is connected to the A-network 2 and the B-network 3 (provided as the gateway), the in-vehicle communication portion 21 communicates with the other A-ECUs 20 connected to the A-network 2 and also communicates with the B-ECUs 40 connected to the B-network 3.

The storage 22 is provided by a data-rewritable non-volatile memory, such as a flash memory or an HDD. Programs and various types of data necessary to control the A-ECU 20 are stored in the storage 22.

The controller 23 is chiefly formed of a typical microcomputer including a CPU, a ROM, a RAM, an input-output, a bus line interconnecting the foregoing components, and so on. The controller 23 performs various types of processing according to programs pre-stored in the ROM, programs pre-stored in the storage 22 provided as a flash memory, and programs loaded into the RAM.

The ECUs connected to the B-network 3 and C-network 4 are of a same configuration as the A-ECUs 20, and detailed description is omitted herein.

Figure 5:
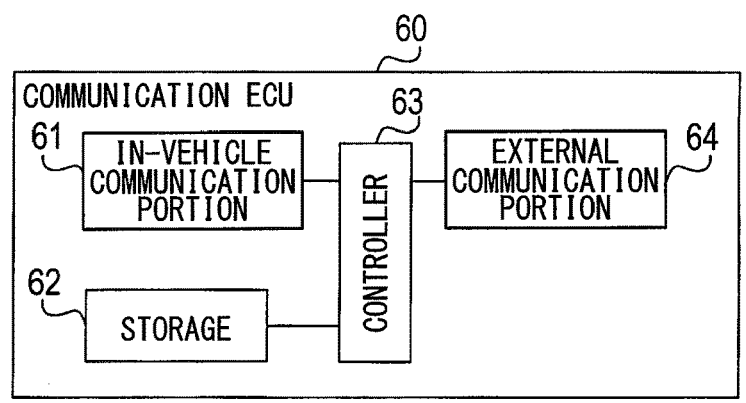
FIG. 5 is a block diagram of a communication ECU of the first embodiment.

However, as an exception, the communication ECU 60 connected to the C-network 4 is configured as follows. That is, the communication ECU 60 includes an in-vehicle communication portion 61, a storage 62, a controller 63, an external communication portion 64 (FIG. 5).

The in-vehicle communication portion 61, the storage 62, and the controller 63 are configured in a same manner, respectively, as the in-vehicle communication portion 21, the storage 22, and the controller 23 included in the A-ECU 20 connected to the A-network 2.

The external communication portion 64 is a portion which communicates with the rewriting tool 30. For example, the external communication portion 64 may wirelessly communicate with the rewriting tool 30 via an unillustrated antenna or may communicate with the rewriting tool 30 via a communication line connected temporarily between the communication ECU 60 and the rewriting tool 30.

(Processing)

Processing when the rewriting tool 30 reprograms an ECU will now be described. As has been described, the relay device 10 relays communication between the rewriting tool 30 and a target ECU (an ECU to be reprogrammed) during reprogramming.

(1) General Outline

Upon receipt of an instruction from a user to reprogram one of the ECUs as a target ECU, the rewriting tool 30 transmits a reprogramming mode shift request, which is a command designating reprogramming, to the target ECU by way of the relay device 10. When the reprogramming is completed, the rewriting tool 30 transmits a reprogramming mode end request, which is a command notifying completion of the reprogramming, to the target ECU.

The rewriting tool 30 is capable of reprogramming multiple target ECUs in parallel at a time. In such a case, the rewriting tool 30 transmits the reprogramming mode shift request individually to the respective target ECUs together with data (rewriting data) constituting a new program. The rewriting tool 30 also transmits a reprogramming mode end request, which is a command notifying completion of the reprogramming, to the target ECUs on which the programming is completed.

Figure 6:
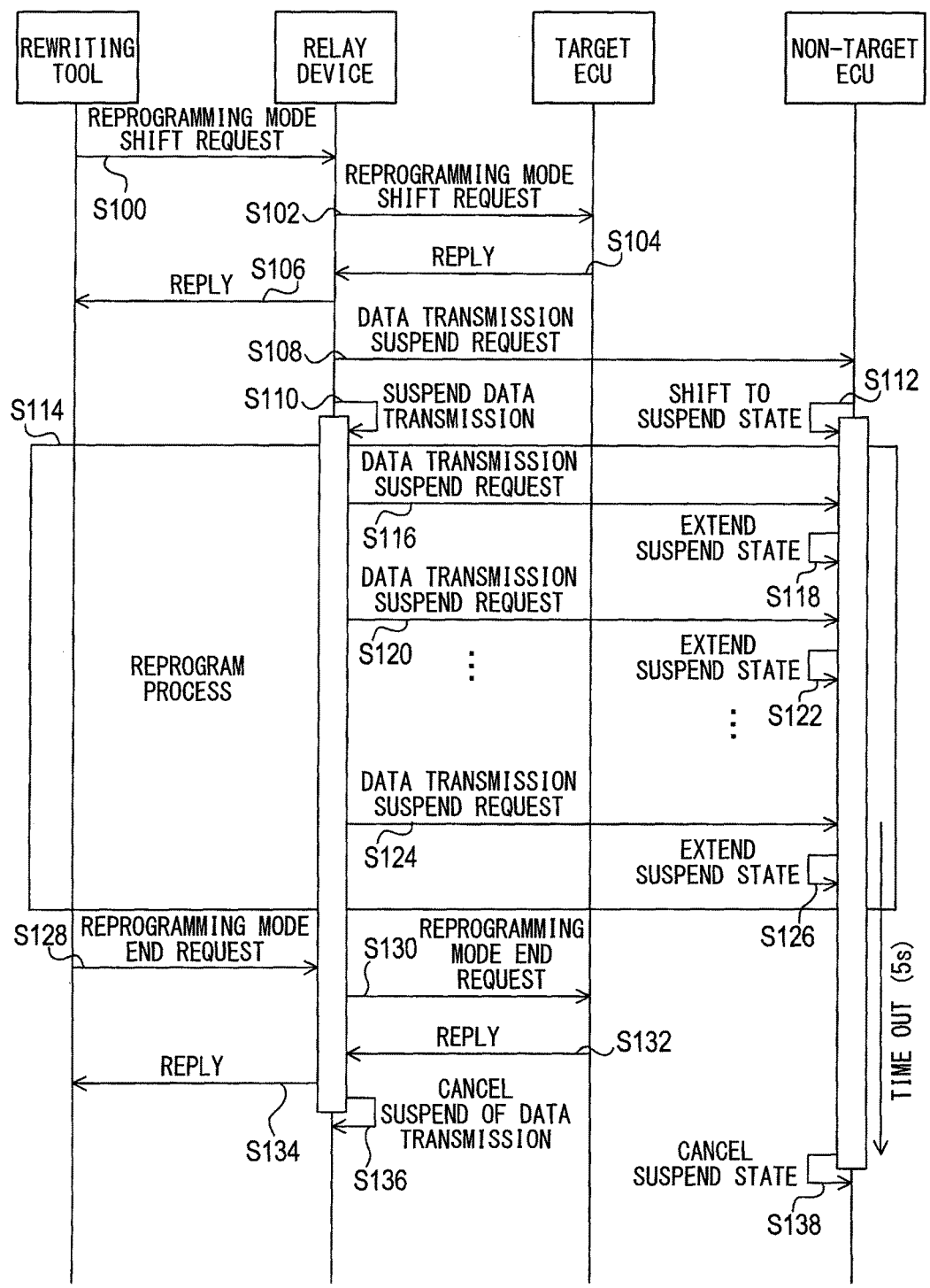
FIG. 6 is a view used to describe processing (reprogram sequence) performed by a rewriting tool, the relay device, and ECUs when reprogramming is performed in the first embodiment.

The following will describe processing (reprogramming sequence) performed by the rewriting tool 30, the relay device 10, and the ECUs when reprogramming is performed (FIG. 6).

In S100, in responding to an instruction from the user, the rewriting tool 30 transmits a reprogramming mode shift request, which is a command instructing a target ECU to start reprogramming (a command addressed to the target ECU as a receiver), to the relay device 10. As has been described, the rewriting tool 30 directly communicates with the relay device 10 through wired or wireless communication in Case 1 (FIG. 1), and the rewriting tool 30 communicates with the relay device 10 via the communication ECU 60 and the C-network 4 in Case 2 (FIG. 2).

In S102, the relay device 10 forwards the reprogramming mode shift request to the target ECU. The target ECU is one of the A-ECUs 20 or the B-ECUs 40 in Case 1. When the target ECU is one of the A-ECUs 20, the relay device 10 communicates with the target ECU via the A-network 2. When the target ECU is one of the B-ECUs 40, the relay device 10 communicates with the target ECU via the A-network 2, the A-ECU 20 serving as the gateway, and the B-network 3. The target ECU is one of the A-ECUs 20 in Case 2, and the relay device 10 communicates with the target ECU via the A-network 2.

In S104, in responding to the reprogramming mode shift request, the target ECU transmits a command indicating a reply of reprogramming start (a command addressed to the rewriting tool 30 as a receiver) to the relay device 10.

In S106, the relay device 10 forwards the reply to the rewriting tool 30.

In S108, the relay device 10 transmits a data transmission suspend request to non-target ECUs for which reprogram is not requested.

The data transmission suspend request is a command instructing the non-target ECU to suspend transmission of data to the vehicle-mounted network over a predetermined suspend period (for example, 5 seconds). The data transmission suspend request may be an instruction to suspend transmission of entire data or a part of data (for example, data of a low importance) to the vehicle-mounted network during reprogramming. The data transmission suspend request instructs the non-target ECU not to determine a failure in receiving necessary data from the vehicle-mounted network during reprogramming as an abnormality (hereinafter, paraphrased as to mask a diagnosis).

The non-target ECU may be all the ECUs forming the vehicle-mounted system 1 other than the target ECU. Alternatively, a part of of the ECUs other than the target ECU may be selected as the non-target ECUs by taking a communication load on the vehicle-mounted network or the like into consideration.

That is, in one example, all of the other ECUs connected to a vehicle-mounted network to which the target ECU is connected may be the non-target ECUs. More specifically, when the target ECU is one of the A-ECUs 20 in Cases 1 and 2, remaining A-ECUs 20 other than the target ECU may be the non-target ECUs. When the target ECU is one of the A-ECUs 20 in Case 2, remaining A-ECUs 20 other than the target ECU may be the non-target ECUs.

In another example, ECUs connected to a vehicle-mounted network by way of which communication is made between the relay device 10 and the target ECU may be the non-target ECUs. To be more specific, when the target ECU is one of the B-ECUs 40 in Case 1, the A-ECUs 20 and remaining B-ECUs 40 other than the target ECU are the non-target ECUs.

In Case 2, too, ECUs connected to a vehicle-mounted network by way of which communication is made between the relay device 10 and the communication ECU 60 may be the non-target ECUs. To be more specific, in addition to the remaining A-ECUs 20 other than the target ECU, the C-ECUs 50 are the non-target ECUs in Case 2.

When the non-target ECUs are determined for each vehicle-mounted network in the manner as above, some ECUs satisfying a predetermined condition among the ECUs connected to the corresponding vehicle-mounted network may be set as the non-target ECUs. When some of the ECUs are selected as the non-target ECUs in the manner as above, it is preferable to transmit an instruction to mask a diagnosis to all ECUs configured to communicate with the non-target ECUs when the data transmission suspend request is transmitted to the non-target ECUs.

In S110, the relay device 10 suspends transmission of a part of data to the vehicle-mounted network. To be more specific, the relay device 10 may suspend transmission of, for example, data other than data necessary for reprogramming.

In S112, in responding to the data transmission suspend request, the non-target ECU suspends transmission of data to the vehicle-mounted network over the suspend period. The non-target ECU may suspend transmission of data to the vehicle-mounted network either entirely or in part. All or some of functions furnished to the non-target ECU may be disabled by stopping a supply of power for the non-target ECU to suspend transmission of data to the vehicle-mounted network. The non-target ECU masks a diagnosis over the suspend period in responding to the data transmission suspend request. More specifically, the non-target ECU is prevented from performing abnormality determination processing relating to data reception from the vehicle-mounted network so as not to perform processing to address an abnormality in the data reception. Hereinafter, a state in which transmission of entire or a part of data to the vehicle-mounted network is suspended while masking a diagnosis may be referred to also as a suspend state.

In S114, the rewriting tool 30 communicates with the target ECU via the relay device 10 to perform reprogram processing in order to reprogram the target ECU.

More specifically, authentication processing is performed first between the rewriting tool 30 and the target ECU to determine whether authorized reprogramming is performed by the rewriting tool 30. When the authentication processing is successful, the target ECU erases a program stored in the storage, acquires rewriting data from the rewriting tool 30 via the relay device 10 or the like, and writes the acquired data into the storage. When writing of the rewriting data is completed, the written data is verified to check whether the data has been written properly. When it is found that the data has been written properly, the reprogram processing is ended.

While the reprogram processing is performed, the relay device 10 acquires data necessary to perform the reprogram processing (data necessary to perform the authentication processing described above, rewriting data, and so on) from the rewriting tool 30, and provides the acquired data to the target ECU. The relay device 10 also acquires data necessary to perform the reprogram processing from the target ECU and provides the acquired data to the rewriting tool 30.

Also, while the reprogram processing is performed, the relay device 10 repeatedly transmits the data transmission suspend request to the non-target ECU at periodical timing (for example, once in every 2.5 seconds) (S116, S120, and S124). Upon receipt of the data transmission suspend request, the non-target ECU shifts to the suspend state over the suspend period from a time of reception as a start time in the same manner as in S112. In other words, the suspend state is extended by another suspend period from a reception time of the data transmission suspend request as a start time (S118, S122, and S126).

In S128, the rewriting tool 30 transmits a reprogramming mode end request, which is a command instructing the target ECU to end the reprogramming (a command addressed to the target ECU as a receiver), to the relay device 10.

In S130, the relay device 10 forwards the reprogramming mode end request to the target ECU.

In S132, in responding to the reprogramming mode end request, the target ECU transmits a command indicating a reply of the reprograming end (a command addressed to the rewriting tool 30 as a receiver) to the relay device 10.

In S134, the relay device 10 forwards the reply to the rewriting tool 30.

In S136, the relay device 10 resumes transmission of data via the vehicle-mounted network and ends transmission of the data transmission suspend request.

In S138, when 5 seconds elapse after reception of the last data transmission suspend request, the non-target ECU resumes transmission of data to the vehicle-mounted network and cancels masking of a diagnosis (in other words, cancels the suspend state).

(2) Abnormality Detection Processing

Figure 7:
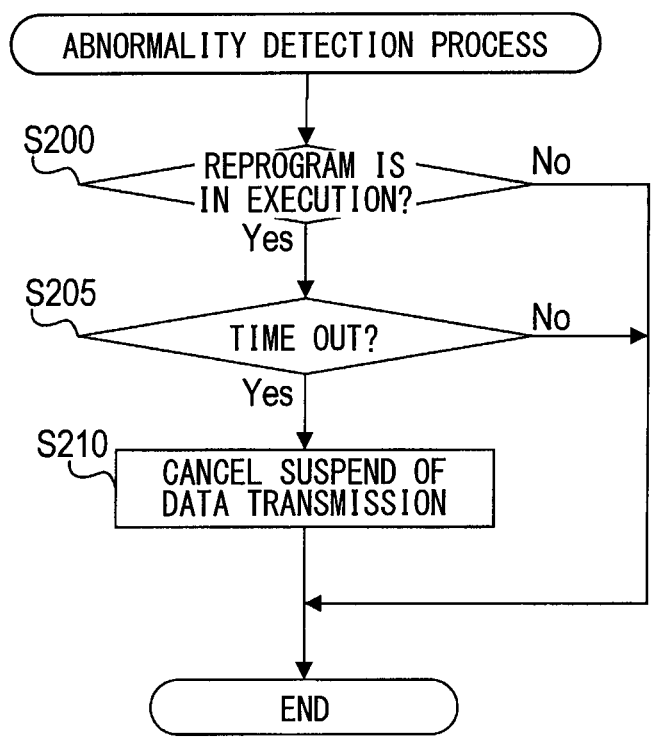
FIG. 7 shows a flowchart depicting abnormality detection processing of the first embodiment.

Abnormality detection processing will now be described (FIG. 7). The abnormality detection processing is processing to allow the non-target ECU to resume communication when data transmission from the rewriting tool 30 is stopped during reprogramming. The abnormality detection processing is performed periodically by the relay device 10.

In S200, the relay device 10 determines whether reprogramming is presently being carried out. To be more specific, for example, a determination may be made according to whether a reprogram counter exhibits a value of 1 or greater. When a positive determination is obtained (S200; YES), advancement is made to S205. When a negative determination is obtained (S200: NO), the abnormality detection processing is ended.

In S205, the relay device 10 determines whether a predetermined abnormality detection duration has elapsed after data is received from the rewriting tool 30 last time. When a positive determination is obtained (S205: YES), advancement is made to S210. When a negative determination is obtained (S205: NO), the abnormality detection processing is ended.

In S210, the relay device 10 cancels the suspend state (a state where transmission of data to the vehicle-mounted network is suspended while masking a diagnosis) of the non-target ECU, and the abnormality detection processing is ended. More specifically, in one example, the relay device 10 may cancel the suspend state by canceling transmission of the data transmission suspend request to the non-target ECU. In another example, the relay device 10 may transmit a data transmission suspending cancel request, which is a command giving an instruction to cancel the suspend state, to the non-target ECU. The non-target ECU may cancel the suspend state in responding to the received data transmission suspending cancel request.

In S205 and S210, the relay device 10 may determine whether the predetermined abnormality detection duration has elapsed after data is received from the target ECU last time in a same manner. The suspend state of the non-target ECU may be cancelled when an elapse of the abnormality detection duration is determined.

(Effects)

According to the first embodiment, effects as follows can be obtained.

(1) According to the vehicle-mounted system 1, the data transmission suspend request is transmitted periodically from the relay device 10 to the non-target ECU while the target ECU is being reprogrammed by the rewriting tool 30 via the vehicle-mounted network. When the non-target ECU receives the data transmission suspend request first time, the non-target ECU shifts to the suspend state (a state where transmission of data to the vehicle-mounted network is suspended while masking a diagnosis) over the suspend period. Thereafter, the suspend state is extended each time the data transmission suspend request is received. When the reprogramming is completed, the suspend state of the non-target ECU is cancelled by canceling transmission of the data transmission suspend request from the relay device 10 to the non-target ECU.

Hence, a communication load on the vehicle-mounted network is restricted during reprogramming and data necessary for the reprogramming is transmitted and received quickly. The ECUs included in the vehicle-mounted system 1 can be thus reprogrammed by an external device at a high speed. After the reprogram processing is completed, the suspend state of the non-target ECU is cancelled in a reliable manner. After the reprogram processing is completed, the non-target ECU can perform processing without any interference. Consequently, the ECUs can be reprogrammed smoothly via the vehicle-mounted network.

(2) The non-target ECU in the suspend state not only suspends transmission of data to the vehicle-mounted network, but also masks a diagnosis. The configuration as above can prevent an inconvenience that suspending of transmission of data by the non-target ECU is erroneously detected as an abnormal state, such as a malfunction, and processing to deal with the abnormal state is performed.

(3) The non-target ECU which has received the data transmission suspend request extends the suspend state by another suspend period. Hence, the non-target ECU cancels the suspend state by itself when transmission of the data transmission suspend request from the relay device 10 stops during the reprogram processing. With this configuration, even when an abnormality occurs in the relay device 10 during the reprogram processing, the non-target ECU returns to a previous state from the suspend state in a reliable manner and is thus capable of operating in a same manner as before the reprogramming.

(4) Processing to make the non-target ECU shift to the suspend state is performed by the relay device 10 installed to the vehicle. Hence, in comparison with a case where the same processing is performed by a device installed outside a vehicle, such as the rewriting tool 30, a risk that the same processing is performed without authorization can be lowered, and security can be ensured further. In a case where the same processing is performed by a device installed outside the vehicle, authentication processing is thought to be essential. In the present disclosure, by performing the processing to make the non-target ECU shift to the suspend state by the relay device 10 installed to the vehicle, a need of the authentication processing is eliminated. Consequently, costs can be reduced.

(5) A low-performance ECU incapable of communicating with a device installed outside the vehicle may be installed to the vehicle. In the present disclosure, the relay device 10 installed to the vehicle is also capable of communicating with such an ECU. Hence, the relay device 10 is also capable of making the low-performance ECU shift to the suspend state by transmitting the data transmission suspend request during reprogramming.

(6) During reprogramming, the relay device 10 cancels the suspend state of the non-target ECU when failing to receive new data from the rewriting tool 30 after an elapse of the abnormality detection duration from the last time data reception from the rewriting tool 30. Hence, the suspend state of the non-target ECUs can be cancelled in a reliable manner when transmission of data from the rewriting tool 30 to the target ECU is stopped due to an abnormality.

The relay device 10 is capable of readily detecting interruption of communication from the rewriting tool 30 during reprogramming. In the present disclosure, the suspend state of the non-target ECUs is cancelled by the relay device 10. Thus, interruption of communication from the rewriting tool 30 during reprogramming can be readily detected and properly treated.

Second Embodiment

A vehicle-mounted system 1 of a second embodiment will now be described. The vehicle-mounted system 1 of the second embodiment is of a same configuration as the counterpart of the first embodiment above, and performs a reprogram sequence and abnormality detection processing in a same manner as in the first embodiment above except that a suspend state is cancelled in a different manner after reprogram processing is completed in the reprogram sequence.

More specifically, in the first embodiment above, the suspend state is cancelled by canceling transmission of the data transmission suspend request after the reprogram processing is completed. In the second embodiment, the suspend state is cancelled by transmitting a data transmission suspending cancel request from a relay device 10 to a non-target ECU.

Figure 8:
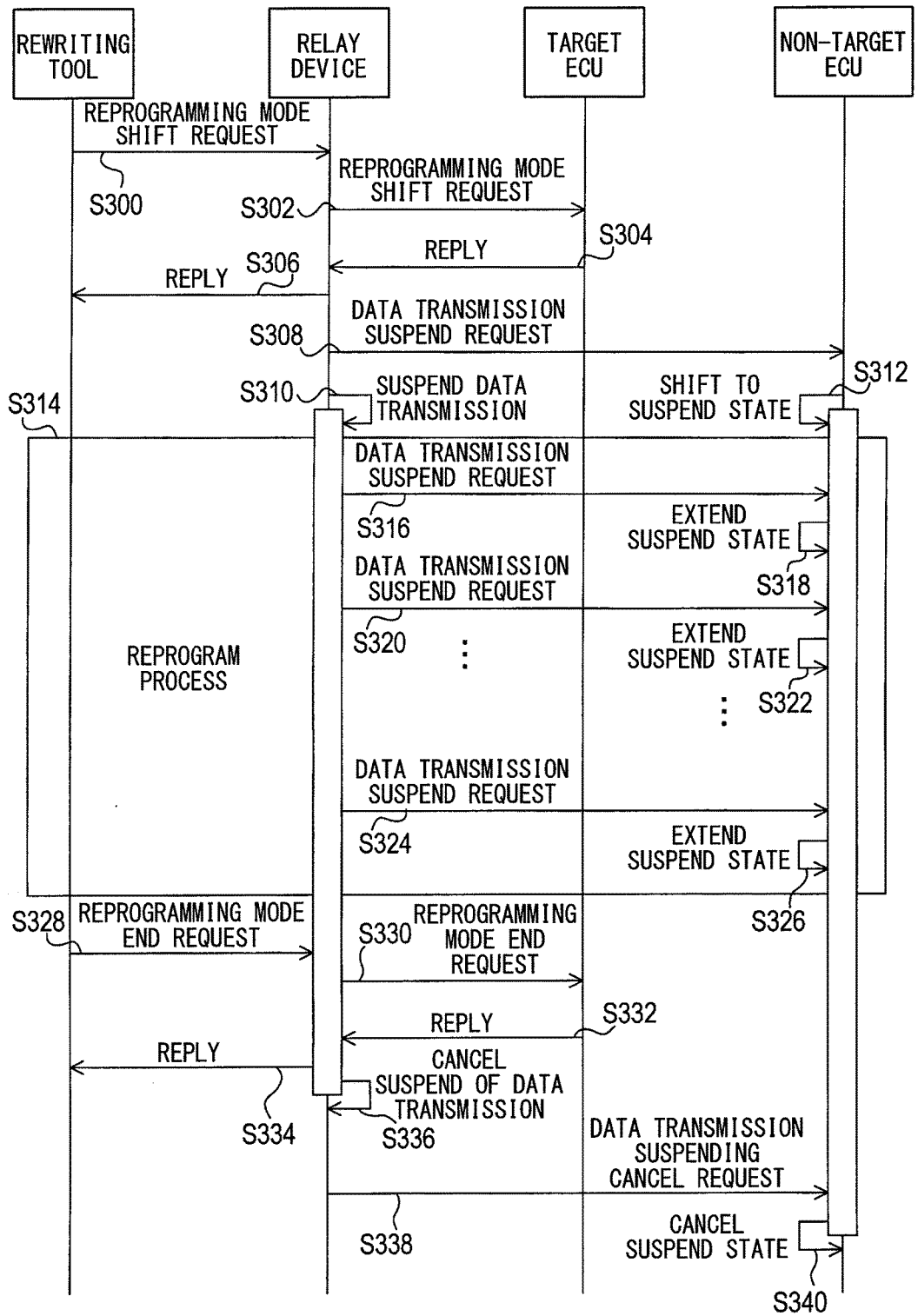
FIG. 8 is a view used to describe a reprogram sequence of a second embodiment.

The following will chiefly describe a difference from the first embodiment above as to the reprogram sequence of the second embodiment (FIG. 8).

S300 through S336 are same as S100 through S136, respectively, in the reprogramming of the first embodiment above, and a description is omitted herein.

In S338, the relay device 10 transmits a data transmission suspending cancel request to the non-target ECU.

In S340, the non-target ECU cancels the suspend state in responding to the received data transmission suspending cancel request.

(Effects)

According to the second embodiment, an effect as follows can be obtained in addition to the effects obtained in the first embodiment above.

In the second embodiment, the data transmission suspending cancel request is transmitted from the relay device 10 to the non-target ECU when the reprogramming is completed, and the non-target ECU cancels the suspend state in responding to the received request. Hence, the suspend state of the non-target ECU can be cancelled as soon as the reprogram processing is completed Third Embodiment A vehicle-mounted system 1 of a third embodiment will now be described. The vehicle-mounted system 1 of the third embodiment is of a configuration same as the counterpart of the first embodiment above except for a part of a content of a reprogram sequence. More specifically, processing to make a non-target ECU shift to a suspend state when reprogramming is started and processing to cancel the suspend state when the reprogramming is completed are different. The following will chiefly describe a difference from the first embodiment above.

(1) General Outline

Figure 9:
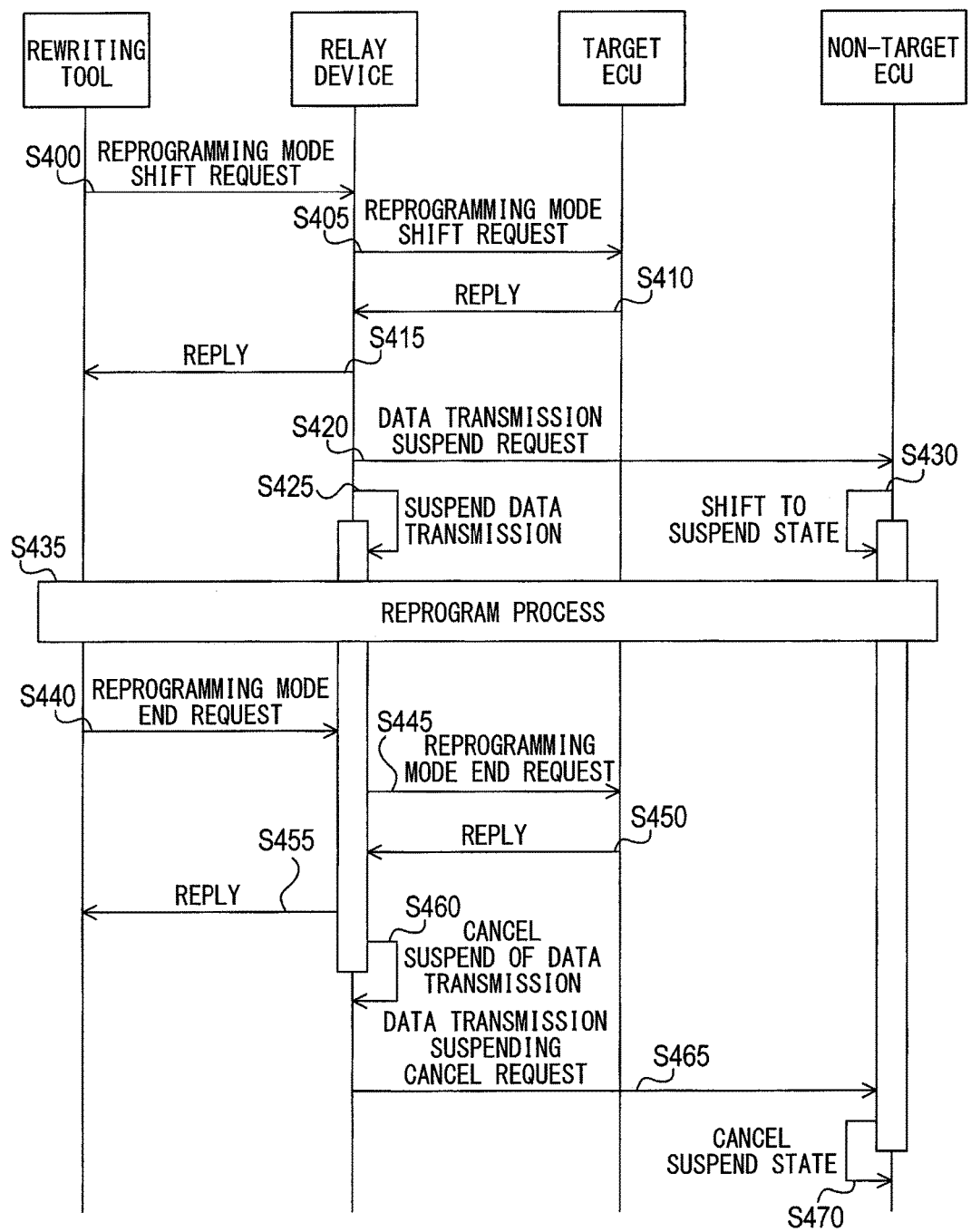
FIG. 9 is a view used to describe a reprogram sequence of a third embodiment.

Firstly, a difference of the reprogram sequence of the third embodiment from the reprogram sequence of the first embodiment above will be chiefly described (FIG. 9).

S400 through S415 are same as S100 through S106, respectively, in the reprogramming of the first embodiment above, and a description is omitted herein.

In S420, a relay device 10 transmits a data transmission suspend request to a non-target ECU. S420 corresponds to S525 of reprogram monitoring processing described below.

As in the first embodiment above, the data transmission suspend request of the third embodiment may direct the non-target ECU to shift to the suspend state only over a suspend period. Alternatively, different from the first embodiment above, the data transmission suspend request may direct the non-target ECU to shift to the suspend state without limiting a time to the suspend period.

S425 is same as S110 in the reprogramming of the first embodiment above, and a description is omitted herein.

In S430, the non-target ECU shifts to the suspend state in a same manner as in S112 of the first embodiment above. In a case where the suspend period is set in the data transmission suspend request, the non-target ECU shifts to the suspend state only over the suspend period.

In S435, the reprogram processing is performed in a same manner as in the first embodiment above. In a case where the suspend period is set in the data transmission suspend request, the relay device 10 transmits the data transmission suspend request periodically to the non-target ECU during the reprogram processing in a same manner as in the first embodiment above. Otherwise the relay device 10 does not repeatedly transmit the data transmission suspend request.

S440 through S455 are same as S128 through S134, respectively, in the reprogramming of the first embodiment above, and a description is omitted herein.

In S460, the relay device 10 resumes transmission of data via a vehicle-mounted network.

Subsequently, the relay device 10 transmits a data transmission suspending cancel request to the non-target ECU (S465). S465 corresponds to S535 of the reprogram monitoring processing described below. The non-target ECU cancels the suspend state in responding to the received data transmission suspending cancel request (S470).

When the suspend period is set in the data transmission suspend request, the suspend state may be cancelled by canceling transmission of the data transmission suspend request from the relay device 10.

(2) Reprogram Monitoring Processing

Figure 10:
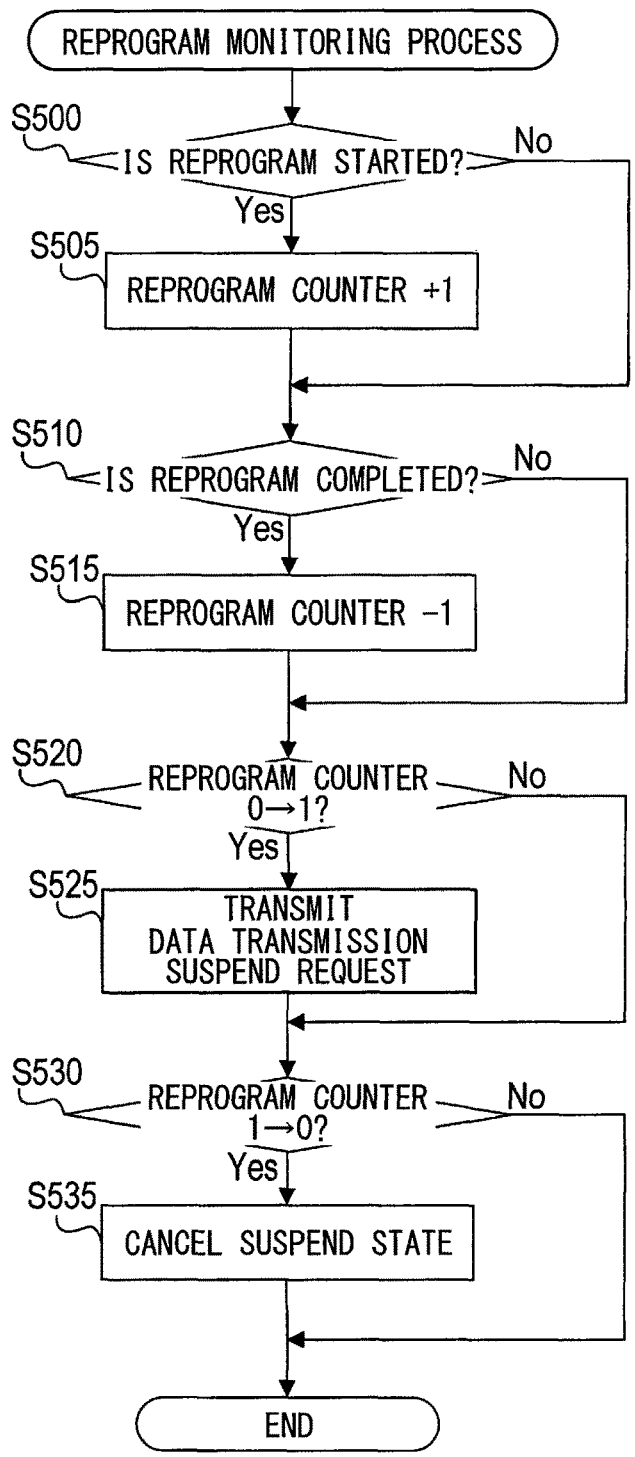
FIG. 10 shows a flowchart depicting reprogram monitoring processing of the third embodiment.

Reprogram monitoring processing performed by the relay device 10 will now be described (FIG. 10). The reprogram monitoring processing is processing to make the non-target ECU shift to the suspend state when reprogramming is started and to cancel the suspend state of the non-target ECU when the reprogramming is completed. The reprogram monitoring processing is performed periodically by the relay device 10.

In S500, the relay device 10 determines whether reprogramming of a new target ECU is started during a reprogramming of a present target ECU according to a command received from a rewriting tool 30. More specifically, for example, when the relay device 10 receives a reprogramming mode shift request for an ECU on which reprogramming is not presently performed as a target ECU, it may be determined that reprogramming of a new target ECU is started. When a positive determination is obtained (S500:

YES), advancement is made to S505. When a negative determination is obtained (S500: NO), advancement is made to S510.

In S505, the relay device 10 increments a reprogram counter exhibiting the number of ECUs on which reprogramming is presently performed, and advancement is made to S510.

In S510, the relay device 10 determines whether reprogramming of the target ECU is completed according to a command received from the rewriting tool 30. More specifically, for example, when the relay device 10 receives a reprogramming mode end request for the target ECU, it may be determined that reprogramming of the target ECU is completed. When a positive determination is obtained (S510: YES), advancement is made to S515. When a negative determination is obtained (S510: NO), advancement is made to S520.

In S515, the relay device 10 decrements the reprogram counter, and advancement is made to S520.

In S520, the relay device 10 determines whether a value of the reprogram counter has changed from 0 to 1 (in other words, determines whether reprogramming is newly started while none of the ECUs is in reprogramming). When a positive determination is obtained (S520: YES), advancement is made to S525. When a negative determination is obtained (S520: NO), advancement is made to S530.

In S525, the relay device 10 transmits the data transmission suspend request to the non-target ECU in a same manner as in S420 of FIG. 9 described above, and advancement is made to S530.

Depending on a manner by which to determine which ECU is to be selected as a non-target ECU, the data transmission suspend request may not be transmitted to ECUs connected to a vehicle-mounted network corresponding to a new target ECU. Herein, the new target ECU is an ECU whose reprogramming is started during reprogramming of another target ECU whose reprogramming is being performed. In such a case, it is preferable to transmit the data transmission suspend request to the ECUs connected to the vehicle-mounted network corresponding to the new target ECU for setting as the non-target ECUs.

In S530, the relay device 10 determines whether the value of the reprogram counter has changed from 1 to 0 (in other words, determines whether reprogramming of all of the target ECUs is completed). When a positive determination is obtained (S530: YES), advancement is made to S535. When a negative determination is obtained (S530: No), the reprogram monitoring processing is ended.

In S535, the relay device 10 cancels the suspend state of the non-target ECU, and the reprogram monitoring processing is ended.

More specifically, when the suspend period is not set in the data transmission suspend request, the relay device 10 may transmit the data transmission suspending cancel request to the non-target ECU. Meanwhile, when the suspend period is set in the data transmission suspend request, the suspend state of the non-target ECU may be cancelled by canceling transmission of the data transmission suspend request, or the suspend state may be cancelled by transmitting the data transmission suspending cancel request to the non-target ECU.

(Effects)

According to the third embodiment, an effect as follows can be obtained in addition to the effects obtained in the first embodiment above.

That is, while the rewriting tool 30 is capable of reprogramming multiple target ECUs in parallel at a time, the relay device 10 counts the number of the target ECUs that perform reprogramming, and cancels the suspend state of the non-target ECU when the number of the target ECUs decreases to 0. Hence, even when multiple ECUs are reprogrammed in parallel at a time, the suspend state of the non-target ECU is cancelled in a reliable manner when reprogramming of all of the target ECUs is completed to allow the non-target ECU to operate in a same manner as before the reprogramming.

Fourth Embodiment

Figure 11:
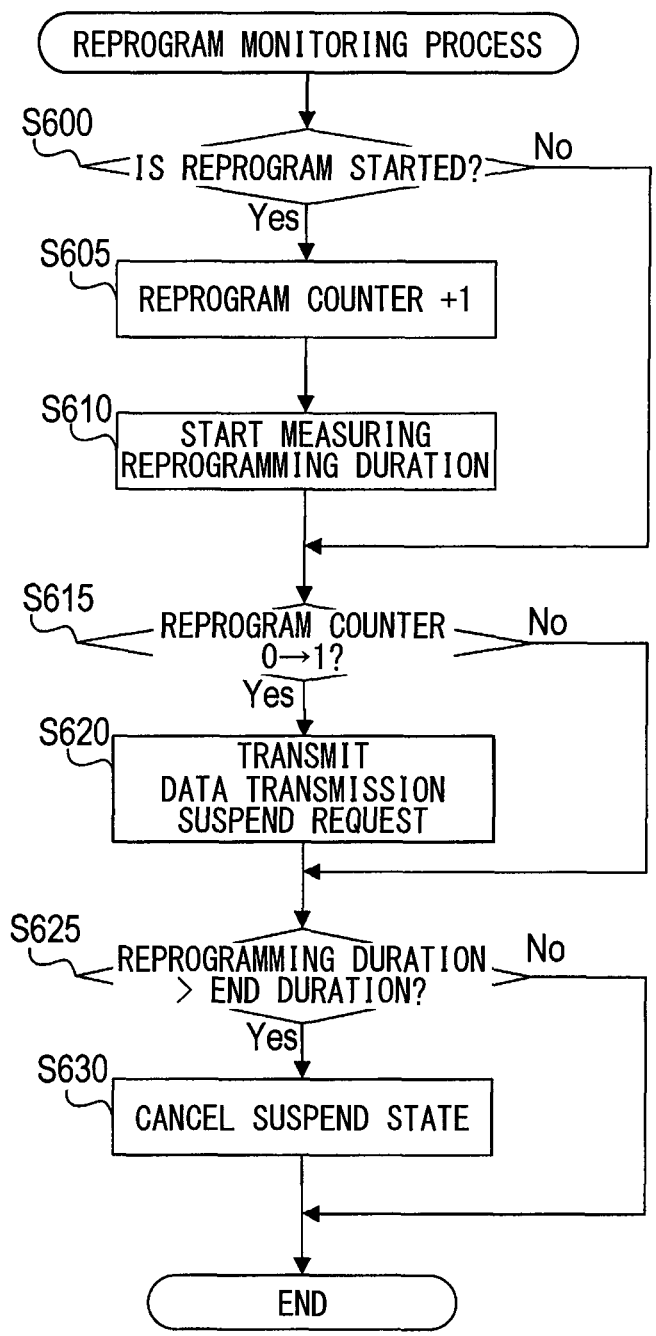
FIG. 11 shows a flowchart depicting reprogram monitoring processing of a fourth embodiment.

A vehicle-mounted system 1 of a fourth embodiment will now be described. The vehicle-mounted system 1 of the fourth embodiment is of a same configuration as the counterpart of the third embodiment above except for processing to cancel a suspend state of a non-target ECU when reprogramming is completed. More specifically, a content of reprogram monitoring processing performed by a relay device 10 is different from the content of the third embodiment above. The following will describe the difference, namely, the reprogram monitoring processing while omitting a description of common portions (FIG. 11).

In S600, the relay device 10 determines whether reprogramming of a new target ECU is started in a same manner as in S500 of the reprogram monitoring processing of the third embodiment above. When a positive determination is obtained (S600: YES), advancement is made to S605.

When a negative determination is obtained (S600: NO), advancement is made to S615.

In S605, the relay device 10 increments a reprogram counter exhibiting the number of ECUs that presently perform reprogramming, and advancement is made to S610.

In S610, the relay device 10 starts measuring a reprogramming duration, and advancement is made to S615. The reprogramming duration is a time period elapsed after a start of most recently started reprogramming of the target ECU. By the processing in S610, each time reprogramming of a new target ECU is started, a measurement value of the reprogramming duration is reset and a time elapsed after a start of most recent reprogramming is measured again as the reprogramming duration.

S615 and S620 are same as S520 and S525, respectively, of the reprogram monitoring processing of the third embodiment above, and a description is omitted herein.

In S625, the relay device 10 determines whether the reprogramming duration exceeds a predetermined end duration. When a positive determination is obtained (S625: YES), advancement is made to S630. When a negative determination is obtained (S625: NO), the reprogram monitoring processing is ended.

In S630, processing same as processing in S535 of the reprogram monitoring processing of the third embodiment above is performed, and subsequently the reprogram monitoring processing is ended.

(Effects)

According to the fourth embodiment, an effect as follows can be obtained in addition to the effects obtained in the third embodiment above.

That is, as has been described, in a case where the rewriting tool 30 is capable of reprogramming multiple target ECUs in parallel at a time, the relay device 10 measures the reprogramming duration, which is a time elapsed after a start of most recently started reprogramming of the target ECU. The relay device 10 cancels the suspend state of the non-target ECU when the last reprogramming duration reaches the predetermined end duration. Hence, by setting the end time to an appropriate length of time, even when multiple ECUs are reprogrammed in parallel at a time, the suspend state of the non-target ECU can be cancelled in a reliable manner after reprogramming of all of the target ECUs is completed to allow the non-target ECU to operate in a same manner as before the reprogramming.

Other Embodiments

While the above has described the embodiments by way of example, the present disclosure can be implemented in various other embodiments.

(1) In the first through fourth embodiments above, a program saved in a target ECU is re-written by the reprogram sequence. Alternatively, a subject to be rewritten is not limited to programs. For example, data (various parameters or the like) saved in a target ECU may be rewritten by the reprogram sequence.

The rewriting tool 30 may perform a failure diagnosis on a target ECU by communicating with the target ECU via the vehicle-mounted network. By performing processing same as the reprogram sequence, a non-target ECU may be shifted to the suspend state during a failure diagnosis on the target ECU and the suspend state of the non-target ECU may be cancelled when the failure diagnosis is completed. To be more specific, the rewriting tool 30 may perform a failure diagnosis on a target ECU during the reprogram processing in the reprogram sequence.

(2) In the first through forth embodiments above, a non-target ECU is shifted to the suspend state by transmitting the data transmission suspend request from the relay device 10 to the non-target ECU. However, the present disclosure is not limited to the configuration as above. A command giving an instruction to suspend transmission of data to the vehicle-mounted system and a command giving an instruction to mask a diagnosis may be transmitted separately from the relay device 10 to the non-target ECU. The non-target ECU may shift to or extend the suspend state by suspending transmission of data to the vehicle-mounted network and masking a diagnosis in responding separately to the respective received commands.

In the second through fourth embodiments above, the suspend state of the non-target ECU is cancelled by transmitting the data transmission suspending cancel request from the relay device 10 to the non-target ECU. However, the present disclosure is not limited to the configuration as above. A command giving an instruction to cancel suspending of transmission of data to the vehicle-mounted network and a command giving an instruction to cancel masking of a diagnosis may be transmitted separately from the relay device 10 to the non-target ECU. The non-target ECU may cancel the suspend state by resuming transmission of data to the vehicle-mounted network and canceling masking of a diagnosis in responding separately to the respective received commands.

(3) Functions furnished to a single component in the respective embodiments above may be allocated to more than one component or functions furnished to multiple components may be intensively allocated to a single component. At least a part of the configurations of the respective embodiments above may be replaced with a configuration furnished with a same function. A part of the configurations of the respective embodiments above may be omitted. At least a part of the configurations of the respective embodiments above may be added to or replaced with the configurations of any other embodiments above.

(4) Besides the vehicle-mounted systems 1 described above, a technical idea of the present disclosure can be implemented by various embodiments, such as the rewriting tool 30 and the relay device 10 and the ECUs forming the vehicle-mounted system 1. Further, a technical idea of the present disclosure can be implemented by various other embodiments, such as a program controlling a computer to function as the relay device 10, the ECUs, and the rewriting tool 30, a medium which stores the above-described program, and a method corresponding to processing performed by the relay device 10, the ECUs, and the rewriting tool 30.

The rewriting tool 30 of the respective embodiments above corresponds to an example of an upgrading tool.

In the reprogram sequence of the first embodiment above, S108 corresponds to an example of a suspend instructing unit, S112 corresponds to an example of a suspending unit, S114 corresponds to examples of upgrade processing, a relay device side acquisition unit, a relay unit, an ECU side acquisition unit, and an upgrading unit. Also, S116, S120, S124, and S136 correspond to an example of a cancel instructing unit, S118, S122, and S126 correspond to an example of a suspend extending unit, and S138 corresponds to an example of a suspend canceling unit. In the present disclosure, upgrading of the ECU may include, such as diagnosis, maintenance, tuning up, fitting-out, repair, update of the ECU.

The data transmission suspend request in S108 corresponds to an example of a suspend command, and the data transmission suspend request in S116, S120, and S124 corresponds to an example of a suspend extending command.

Also, S210 in the abnormality detection processing corresponds to an example of an abnormality treating unit.

In the reprogram sequence of the second embodiment above, S308 corresponds to an example of the suspend instructing unit, S312 corresponds to an example of the suspending unit, S314 corresponds to examples of the upgrade processing, the relay device side acquisition unit, the relay unit, the ECU side acquisition unit, and the upgrading unit. Also, S316, S320, S324, and S338 correspond to an example of the cancel instructing unit, and S340 corresponds to an example of the suspend canceling unit.

The data transmission suspend request in S308 corresponds to an example of the suspend command, the data transmission suspend request in S316, S320, and S324 corresponds to an example of the suspend extending command, and the data transmission suspending cancel request in S338 corresponds to an example of a suspend canceling command.

In the reprogram sequence of the third embodiment above, S420 corresponds to an example of the suspend instructing unit, S430 corresponds to an example of the suspending unit, S435 corresponds to examples of the upgrade processing, the relay device side acquisition unit, the relay unit, the ECU side acquisition unit, and the upgrading unit. Also, S465 corresponds to an example of the cancel instructing unit, and S470 corresponds to an example of the suspend canceling unit.

The data transmission suspend request in S420 corresponds to an example of the suspend command, and the data transmission suspending cancel request in S465 corresponds to an example of the suspend canceling command.

In the reprogram monitoring processing, S500 corresponds to an example of a start determination unit, S505 and S515 correspond to an example of a counting unit, S510 corresponds to an example of an end determination unit, and S530 and S535 correspond to an example of the cancel instructing unit.

In the reprogram monitoring processing of the fourth embodiment above, S600 corresponds to an example of the start determination unit, and S625 and S630 correspond to an example of the cancel instructing unit.

What is claimed is:

1. A relay device comprising:
    a memory storing a program;
    a processor that, when executing the program, is configured to:
        acquire data necessary to perform an upgrade processing from an upgrading tool, wherein the upgrading tool performs the upgrade processing to upgrade Electronic Control Units (ECUs) connected to a vehicle-mounted network, and the ECUs include a target Electronic Control Unit (ECU) which is subject to the upgrade processing and a non-target ECU which is not subject to the upgrade processing;
        provide, via the vehicle-mounted network, the acquired data to the target ECU;
        transmit, via the vehicle-mounted network, a suspend command which instructs the non-target ECU to shift to a suspend state in response to a start of the upgrade processing, the suspend state being a state in which a transmission of other data to the non-target ECU via the vehicle-mounted network is suspended;
        instruct, via the vehicle-mounted network, the non-target ECU to cancel the suspend state when the upgrade processing is completed; and
        instruct the non-target ECU to cancel the suspend state via the vehicle-mounted network when the processor fails to acquire, from the upgrading tool, the data necessary to perform the upgrade processing over a period longer than a predetermined abnormality detection duration during an execution of the upgrade processing.

2. The relay device according to claim 1, wherein the processor, when executing the program, is further configured to:
    periodically transmit, via the vehicle-mounted network, a suspend extending command which instructs the non-target ECU to extend the suspend state by a predetermined period during an execution of the upgrade processing, and
    instruct a cancel of the suspend state of the non-target ECU by canceling a transmission of the suspend extending command.

3. The relay device according to claim 1, wherein the processor, when executing the program, is further configured to:
    periodically transmit, via the vehicle-mounted network, a suspend extending command which instructs the non-target ECU to extend the suspend state by a predetermined period during an execution of the upgrade processing, and
    instruct, when the upgrade processing is completed, a cancel of the suspend state of the non-target ECU by transmitting, via the vehicle-mounted network, a suspend canceling command which instructs the non-target ECU to cancel the suspend state.

4. The relay device according to claim 1, wherein the ECUs include one or more target ECUs, and the processor, when executing the program, is further configured to:
    determine whether the upgrade processing for upgrading one of the one or more target ECUs is started according to the data acquired from the upgrading tool;
    determine whether the upgrade processing for upgrading the one of the one or more target ECUs is completed according to the data acquired from the upgrading tool; and
    count a total number of the one or more target ECUs to which the upgrade processing is presently performed according to a determination result of whether the upgrade processing for upgrading one of the one or more target ECUs is started and a determination result of whether the upgrade processing for upgrading one of the one or more target ECUs is completed; and
    instruct a cancel of the suspend state of the non-target ECU via the vehicle-mounted network when the total number of the one or more target ECUs counted by decreases to zero.

5. The relay device according to claim 1, wherein the processor, when executing the program, is further configured to:
    determine whether the upgrade processing for the target ECU is started according to the data acquired from the upgrading tool,
    wherein
    a time when the processor determines that the upgrade processing is started is defined as a start time, and
    wherein the processor, when executing the program, is further configured to instruct a cancel of the suspend state of the non-target ECU via the vehicle-mounted network when a predetermined end duration elapses from the start time.

6. The relay device according to claim 1, wherein
    the non-target ECU in the suspend state does not treat a failure in a data acquiring via the vehicle-mounted network as an abnormality.

7. An Electronic Control Unit (ECU) comprising:
    a memory storing a program;
    a processor that, when executing the program, is configured to:
        acquire, via a vehicle-mounted network, data necessary to perform an upgrade processing of the ECU from an upgrading tool through a relay device;
        perform a processing associated with the upgrade processing according to the acquired data;
        shift the ECU to a suspend state in which a data transmission via the vehicle-mounted network is suspended upon receipt of a suspend command from the relay device via the vehicle-mounted network when the upgrade processing is started; and
        cancel the suspend state upon receipt of a command from the relay device via the vehicle-mounted network when the upgrade processing is completed;
        wherein the relay device instructs the ECU to cancel the suspend state via the vehicle-mounted network when the relay device fails to acquire, from the upgrading tool, the data necessary to perform the upgrade processing over a period longer than a predetermined abnormality detection duration during an execution of the upgrade processing.

8. The ECU according to claim 7, wherein the processor, when executing the program, is further configured to:
    extend the suspend state by a predetermined suspend period upon receipt of a suspend extending command from the relay device via the vehicle-mounted network during an execution of the upgrade processing, the suspend extending command instructing an extension of the suspend state by the predetermined suspend period, wherein, when processor receives the command for canceling the suspend state from the relay device, the processor cancels the suspend state under a condition that the predetermined suspend period is elapsed after receiving the suspend extending command from the relay device.

9. A vehicle-mounted system comprising:

a plurality of Electronic Control Units (ECUs) connected to a vehicle-mounted network; and a relay device connected to a vehicle-mounted network, wherein the relay device includes a first memory storing a first program and a first processor that, when executing the first program, is configured to:
- acquire data necessary to perform an upgrade processing from an upgrading tool, wherein the upgrading tool performs the upgrade processing to upgrade the plurality of ECUs, and the plurality of ECUs include a target Electronic Control Unit (ECU) which is subject to the upgrade processing and a non-target ECU which is not subject to the upgrade processing;
- provide, via the vehicle-mounted network, the data acquired by the first processor to the target ECU;
- transmit, via the vehicle-mounted network, a suspend command which instructs the non-target ECU to shift to a suspend state in response to a start of the upgrade processing, the suspend state being a state in which a transmission of other data to the non-target ECU via the vehicle-mounted network is suspended; and
- instruct, via the vehicle-mounted network, the non-target ECU to cancel the suspend state when the upgrade processing is completed, and each of the plurality of ECUs includes a second memory storing a second program and a second processor that, when executing the second program, is configured to:
- acquire, from the relay device via the vehicle-mounted network, data that is necessary to perform the upgrade processing of an own ECU and transmitted from the upgrading tool through the relay device;
- perform a processing associated with the upgrade processing according to the data acquired by the second processor;
- shift the own ECU to the suspend state upon receipt of the suspend command from the relay device via the vehicle-mounted network when the upgrade processing is started;
- cancel the suspend state upon receipt of a command from the relay device when the upgrade processing is completed;

and the first processor, when executing the first program, is further configured to instruct the non-target ECU to cancel the suspend state via the vehicle-mounted network when the first processor fails to acquire, from the upgrading tool, the data necessary to perform the upgrade processing over a period longer than a predetermined abnormality detection duration during an execution of the upgrade processing.

10. The vehicle-mounted system according to claim 9, wherein the first processor, when executing the first program, is further configured to:
- periodically transmit, via the vehicle-mounted network, a suspend extending command which instructs the non-target ECU to extend the suspend state by a predetermined suspend period during an execution of the upgrade processing,
- instruct the non-target ECU to cancel the suspend state by canceling a transmission of the suspend extending command;

the second processor, when executing the second program, is further configured to:
- extend the suspend state by the predetermined suspend period upon receipt of the suspend extending command from the relay device via the vehicle-mounted network during the execution of the upgrade processing, and
- cancel, when the the command that instructs cancellation of the suspend state is received from the relay device, the suspend state after the predetermined suspend period elapses after from reception time of the suspend extending command.

* * * * *